S. H. SUMMERSCALES.
TRACTION WHEEL.
APPLICATION FILED DEC. 19, 1911.
1,095,943.
Patented May 5, 1914.
2 SHEETS—SHEET 1.
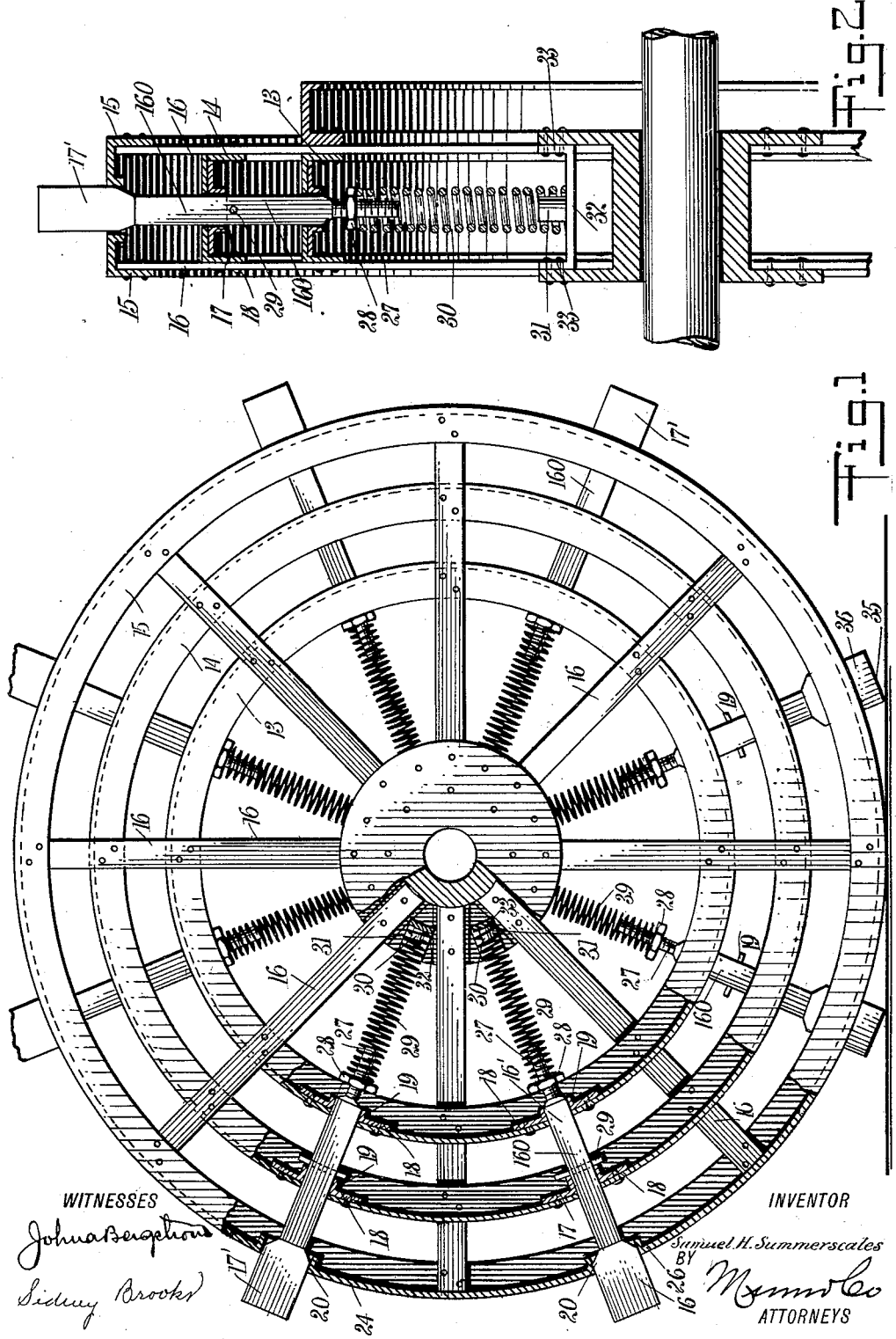

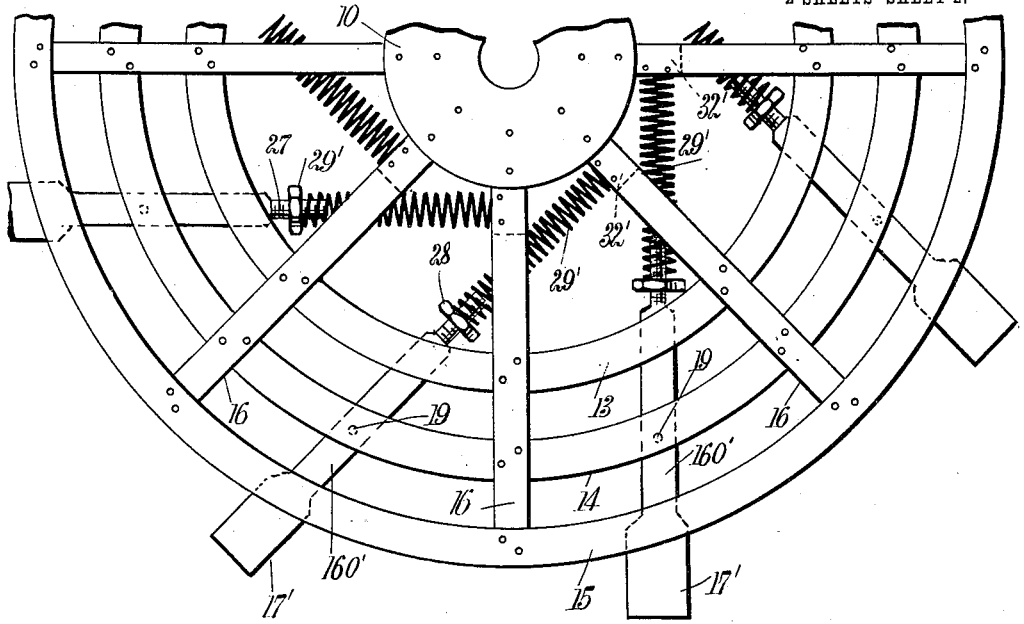

UNITED STATES PATENT OFFICE.

SAMUEL HENRY SUMMERSCALES, OF WINNIPEG, MANITOBA, CANADA.

TRACTION-WHEEL.

1,095,943.  Specification of Letters Patent.  Patented May 5, 1914.

Application filed December 19, 1911. Serial No. 666,743.

*To all whom it may concern:*

Be it known that I, SAMUEL H. SUMMERSCALES, a subject of the King of England, and a resident of Winnipeg, Manitoba, Dominion of Canada, have invented certain new and useful Improvements in Traction-Wheels, of which the following is a specification.

This invention relates to an improvement in traction wheels.

The primary object of the invention is to provide a traction wheel with a plurality of spuds for contact with the ground to cause the wheel to "take hold" as the same is rotated.

A further object of the invention is to so support the spuds or spurs with respect to the wheel that the load will not be sustained thereby.

A still further object is to so arrange the spuds that they contact with the ground in advance of the contact of the wheel tread, the arrangement being such that the contacting spud offers a certain resistance to the ground prior to the contact of the wheel tread therewith.

The invention consists in certain novel constructions and combinations of parts as will be hereinafter described and claimed.

In the drawings Figure 1 is a side elevation, partly in section, of the preferred construction; Fig. 2 a vertical section taken on the line 2—2 of Fig. 1; Fig. 3 a side elevation of a portion of a wheel showing a slightly modified arrangement of the spuds. Fig. 4 a section on the line 4—4 of Fig. 3, and Fig. 5 an enlarged detail view of the spud shoe.

In the drawings, 10 designates a hub which is formed with the flanges 11 and 12. A plurality of circular elements 13, 14, 15, are arranged concentric with the said hub, the said elements being supported by the radially extending spokes 16, the said spokes being arranged in pairs, the spokes of each pair being disposed in spaced parallel relation and secured on opposite sides of the concentric elements. The elements 13, 14, 15 are substantially U-shaped in cross-section, the spokes 16 being secured to the outer surface of the two innermost elements and extending within the outer element which forms a tread or tire, suitable securing devices being passed through the flanges of the circular elements and through the said spokes. The circular elements are provided at various points with openings which receive the shanks 160 of the spuds and adjacent the openings in the inner circular elements are disposed brackets 17, formed with bearing sleeves 18 which direct the movement of the shanks 160, each shank being provided with a transversely disposed stop 19 which contacts with the sleeve 18 of the bracket of the middle element restricting the thrust of said shank. The shank extends to a point adjacent an opening 20 formed in the tire or tread element and secured to said shank is the shoe shown in detail in Fig. 5, this shoe being provided with the removable calk 21 formed with teeth 22, said calk being provided with the dove-tail ribs 23 which extend within corresponding dove-tail grooves in the shoe, the calk being secured to the shoe by securing devices 24, the shoe being attached to the shank 160 by screws 25. These shoes are guided in their movement by the inwardly disposed flange portion 26 of the tire.

The end of the shank remote from the shoe terminates in the reduced screw-threaded extension 27 which receives a nut 28. Interposed between said nut and the hub 10 are coil springs 29, the terminal 30 of each spring being housed by the flanges 11 and 12 of the hub, said spring 29 embracing a stud 31 supported by the U-shaped bracket 32, the offset ends 33 of which are bolted to the flanges 11 and 12. The other end of this spring contacts with the nut 28, said nut being adjusted on the screw threaded extension 27 to regulate the tension of the spring. As all of the spuds in this form of device are supported in the same manner, the detail description of one will suffice for all, the spuds being of a number consistent with the diameter of the wheel.

It will be noted that in this construction the spuds will be projected by the springs until the transversely disposed stops 19 limit their movement, the movement being so limited that all of the shoe does not project through the rim. As the wheel travels forward, the spuds will contact with the ground in advance of the contact of the tread with the ground, the heel of the shoe being engaged by the ground, thus causing the toe of the shoe to contact with the side walls of the opening 20 in the rim, the shank of the spud being held against backward movement by its contact with the inner elements. Thus the initial contact of the spud with the ground resists the tendency of the spud to slide inwardly against the tension of the springs 29, this contact of the shoe with the ground forcing the wheel forward, the pressure against the shoe gradually increasing until the same is forced to its extreme inner position.

In the form shown in Fig. 3, the structure of the supporting wheel is the same as that shown in the preferred form, the brackets 32 which support the springs being omitted from the hub in this form. In the preferred form, the spuds extend radially from the hub member while in the modified form, the shanks 160' are disposed tangentially with respect to the hub, the springs 29' being interposed between the nut 28' and a bracket 32' similar in construction to the bracket 32, the brackets 32' being supported by the spaced spokes 16. The spuds are mounted to move in the same manner as shown in the preferred form, the same being disposed at a different angle with respect to the tread rim, the spuds moving in a line tangential to the hub 10. The projecting spring of one spud passes between the spokes or braces which support the projecting spring of an adjacent spud, the spring being supported by a bracket 32' carried by the next adjacent pair of braces. This arrangement decreases the angle at which the shoe contacts with the ground, thus increasing the initial resistance of the shoe and exerting a greater forward movement to the wheel. In this construction as in the form shown in Fig. 1, the spuds do not receive the load and the same result is attained as in the preferred form, the rim lying flush with the ground as it passes over the same. Particular attention is called to the peculiar manner in which the spud projecting springs are supported in this form, lateral movement of the springs being prevented by the spaced spokes between which each spring extends. Attention is also called to the construction of the shoe which is substantially rectangular, the calk 21 being readily removed and replaced without removing the shoe from the shank.

I claim:

1. A traction wheel comprising a hub, the said hub being formed with flanges, radially extending spokes secured to the flanges, the said spokes being arranged in pairs, the spokes of each pair being in spaced parallel relation, a plurality of U-shaped concentric and apertured elements to which the spokes are secured, spuds movably mounted in the apertures of the said elements, the said spuds being disposed tangentially with respect to the said hub, a bracket supported by each pair of spokes, said bracket being formed with a centrally disposed stud, and a coiled spring, one end of the said spring embracing the said stud, the said spring passing between an adjacent pair of spokes and embracing the inner end of a spud.

2. A traction wheel, comprising a hub having a flange at each end, an apertured outer rim, one or more apertured inner rims, the rims being U-shaped, spokes arranged in pairs and secured to the flanges of the hub and to the rims, spuds working in the apertures of the rims and disposed tangentially with respect to the hub, the spuds having their outer ends normally projecting beyond the outer rim and their inner ends always projecting beyond the inner face of the innermost rim, the said inner ends of the spuds being reduced and threaded and provided with nuts, a seat for a spring arranged between each pair of spokes adjacent to the hub, and coiled springs each having its inner end engaging the seat and its outer end receiving the threaded inner end of a spud.

3. A traction wheel, comprising a hub having a flange at each end, three concentric and apertured U-shaped rims, spokes arranged in pairs and secured to the flanges of the hub and to the rims, spuds working in the apertures of the rims and having their inner ends reduced and threaded and provided with nuts on the said ends, stops on the spuds between the two inner rims, coiled springs located in the space between the innermost rim and hub and into the outer end of which the threaded ends of the spuds project, and seats for the inner ends of the said springs.

4. A traction wheel, comprising a hub, an apertured outer rim, one or more apertured inner rims, spokes secured to the hub and rims, spuds working in the apertures of the rims, the spuds each consisting of a foot portion lying normally outside of the outer rim, but movable inwardly through the aperture thereof, and a shank portion lying mainly between the outer rim and the innermost rim, and provided with an extension lying wholly inward of the innermost rim, and springs located in the space between the innermost rim and the hub and pressing the spuds outwardly.

SAMUEL HENRY SUMMERSCALES.

Witnesses:
WILLIAM McKAY,
J. E. COSTELLO.